US007030941B2

(12) United States Patent
Kobayashi et al.

(10) Patent No.: US 7,030,941 B2
(45) Date of Patent: Apr. 18, 2006

(54) LIQUID CRYSTAL DISPLAY DEVICE

(75) Inventors: Setsuo Kobayashi, Mobara (JP); Kazuhiko Yanagawa, Mobara (JP)

(73) Assignee: Hitachi Displays, Ltd., Mobara (JP)

( * ) Notice: Subject to any disclaimer, the term of this patent is extended or adjusted under 35 U.S.C. 154(b) by 0 days.

(21) Appl. No.: 10/438,101

(22) Filed: May 15, 2003

(65) Prior Publication Data

US 2004/0041759 A1 Mar. 4, 2004

(30) Foreign Application Priority Data

May 15, 2002 (JP) ............................ 2002-139684

(51) Int. Cl.
*G02F 1/133* (2006.01)

(52) U.S. Cl. ........................... 349/33; 349/34; 349/36; 349/130; 349/150; 349/151; 345/87; 345/99

(58) Field of Classification Search ................ 349/130, 349/150, 151, 33, 34, 36; 345/87, 99
See application file for complete search history.

(56) References Cited

U.S. PATENT DOCUMENTS 5,473,455 A * 12/1995 Koike et al. ................ 349/124
5,699,078 A * 12/1997 Yamazaki et al. ............ 345/89
6,281,952 B1 * 8/2001 Okamoto et al. ............. 349/12

FOREIGN PATENT DOCUMENTS

| | | |
|---|---|---|
| JP | 11-72793 | 3/1999 |
| JP | 11-109355 | 4/1999 |
| JP | 11-352489 | 12/1999 |
| JP | 2001-42282 | 2/2001 |
| JP | 2001-042282 | 2/2001 |
| JP | 2002-023703 | 1/2002 |

* cited by examiner

*Primary Examiner*—Tarifur R. Chowdhury
*Assistant Examiner*—George Y. Wang
(74) *Attorney, Agent, or Firm*—Antonelli, Terry, Stout and Kraus, LLP.

(57) ABSTRACT

A liquid crystal display device includes a first substrate and a second substrate, which are arranged to face each other in an opposed manner by way of liquid crystal material, first electrodes which are formed in a pixel region of a liquid-crystal-side surface of the first substrate, and second electrodes which are formed in a pixel region of a liquid-crystal-side surface of the second substrate. In such a liquid crystal display device, liquid crystal molecules are arranged in the vertical direction with respect to the substrates in a state in which an electric field is not applied between the first electrodes and the second electrodes. The liquid crystal display device, with respect to a voltage applied between the first electrodes and the second electrodes, intermittently applies a voltage which is equal to or less than 20% of the maximum voltage.

16 Claims, 11 Drawing Sheets

LIQUID CRYSTAL DISPLAY DEVICE

BACKGROUND OF THE INVENTION

The present invention relates to a liquid crystal display device; and, more particularly, to a so-called vertical orientation type liquid crystal display device.

A liquid crystal display device is configured such that the optical transmissivity of a liquid crystal material in each pixel region is controlled in response to an electric field which is generated between a pair of electrodes and is applied to the liquid crystal material.

In such a liquid crystal display device, orientation films are arranged so as to be directly brought into contact with the liquid crystal material, thereby to determine the initial orientation direction of the liquid crystal when an electric field is not applied to the liquid crystal.

Further, although the orientation films conventionally require orientation treatment by rubbing, there is a liquid crystal mode which requires no rubbing treatment and can omit step for such a treatment, and a so-called vertical orientation type liquid crystal display device has been developed (see Japanese Patent Laid Open 11-72793, 11-109355, 11-352489, for example) on the basis of such a liquid crystal mode.

That is, with the use of so-called vertical orientation films, without use of rubbing treatment, liquid crystal molecules are arranged in the vertical direction with respect to the substrates when no electric field is applied to the liquid crystal material, and these molecules are tilted down in a plurality of directions when an electric field is applied to the liquid crystal material.

Here, due to such tilting-down of the liquid crystal molecules in a plurality of directions, the vertical orientation type of device has a feature in that a broad viewing angle can be simultaneously achieved as part of the liquid crystal display characteristics.

SUMMARY OF THE INVENTION

However, in a liquid crystal display device of the type described above, as a result of further extensive studies made by the inventors of the present invention, as shown in FIG. 22A to FIG. 22C, it has been found that, when a pressure is applied to a liquid crystal display panel LPNL from the outside, for example, when a user lightly pushes on a liquid crystal display part AR thereof with his finger, a trace corresponding to the pushed portion remains for a long time spanning about several tens of minutes per one pushing operation (the trace which remains in this manner will be referred to as a "dark spot" in this specification for convenience sake).

Such an operation to push the liquid crystal display panel LPNL is frequently performed when a discussion is being carried out among a plurality of people, while watching a display produced on the liquid crystal display panel LPNL, or when a liquid crystal display part AR of the liquid crystal display part LPNL is wiped or the like, for example. Accordingly, the fact that the trace remains in the above-mentioned manner creates a serious drawback in the practical use of the display device. This is because the liquid crystal display panel LPNL cannot produce a normal display at the location of the trace remaining portion of the display device.

As can be understood from respective manipulations shown in FIG. 22A, FIG. 22B, FIG. 22C, the occurrence of the trace is apparent. That is, the trace which is produced by pushing with a finger remains as it is, and when the liquid crystal display panel LPNL is pushed while moving the finger along a path having the shape of a letter or a figure, for example, the trace remains over a long time. Here, FIG. 22A shows a state in which a display screen of the liquid crystal display panel is not pushed; FIG. 22B shows a state in which the finger is moved while pushing the display screen; and FIG. 22C shows a state in which a trace remains after the finger is moved away from the display screen.

To explain the reasons why such a phenomenon occurs, while focusing on the behavior of the liquid crystal material, first of all, as shown in FIG. 23A to FIG. 23C, by giving the directivity to the direction of an electric field E generated between a pair of electrodes PX, CT that are respectively formed on respective substrate sides at a partial region (center in the drawing), the direction in which the liquid crystal molecules are tilted involves a plurality of directions.

Then, when the electric field E is increased sequentially in the order of FIG. 23A, FIG. 23B and FIG. 23C (changing a voltage applied to a pair of electrodes in the order of small→medium→large), the liquid crystal molecules LC are tilted down in two directions at a center portion, and the liquid crystal molecules LC arranged outside the center portion are tilted down in the same directions based on the tilting directions of the liquid crystal molecules LC in the center portion.

Further, as shown in FIG. 24A to FIG. 24C, when one substrate in an intermediate state (FIG. 24A) is pushed (FIG. 24B), the distance between the substrate SUB1 and the substrate SUB2 is narrowed (d2<d1); and, hence, the distance between the pixel electrode PX and the counter electrode CT is narrowed.

This implies that the intensity of the electric field E between the pixel electrode PX and the counter electrode CT is increased so that the liquid crystal molecules are pushed to each other, whereby an electric field stronger than a display electric field corresponding to an original gray scale is applied.

As a result, it is recognized that an intermediate layer MIDL, which is formed of liquid crystal molecules arranged substantially horizontally, is formed in the vicinity of the center of the liquid crystal layer between the substrates.

Since the liquid crystal molecules are arranged substantially horizontally relative to each other in this intermediate layer MIDL, the long axis directions of the liquid crystal molecules are juxtaposed, whereby a strong intermolecular force acts between the liquid crystal molecules. Accordingly, it is recognized that the intermediate layer MIDL assumes a metastable state, and this state is fixed so as to exhibit a memory effect.

Then, when the pushing force is eliminated, the distance between the substrates returns to d1 (FIG. 24C). Here, the liquid crystal molecules in the vicinity of the vertical orientation films AL1, AL2 return to the original tilting state which is given by the electric field E. However, even when such a state is assumed, it can be seen that the liquid crystal molecules in the intermediate layer MIDL still maintain in a substantially horizontal state.

It has been found that this phenomenon occurs for the following reasons. That is, the only liquid crystal molecules, to which the orientation effect of liquid crystal molecules generated by the vertical orientation films AL1, AL2 extends, are the liquid crystal molecules which are brought into contact with the orientation films, and the arrangement of the liquid crystal molecules, other than these liquid crystal molecules, is determined on the basis of the electric field between the pixel electrode PX and the counter electrode CT and the intermolecular force between the liquid crystal molecules.

That is, the liquid crystal molecules that are disposed at positions other than the interfaces are caused to tilt in the horizontal direction or in the lateral direction by the electric field E and to return in the vertical direction or the longitudinal direction by the intermolecular force between the liquid crystal molecules. Accordingly, with respect to the liquid crystal molecules that are disposed at positions other than the interfaces, their degree of tilting is determined on the basis of the balance between the electric field E and the intermolecular force between the liquid crystal molecules.

In the case where the display panel is free from the above-mentioned pushing force, the liquid crystal molecules are tilted by the electric field as shown in FIG. 23B, and the neighboring liquid crystal molecules are tilted, while their long axis directions are substantially juxtaposed to each other. Accordingly, the intermolecular force assumes a state in which the intermolecular force strongly acts between the molecules in the longitudinal direction of the liquid crystal layer.

Accordingly, when the electric field is decreased, the liquid crystal molecules return to the tilting corresponding to the intensity of the electric field E after the whole electric field is reduced substantially uniformly. Then, by setting the electric field to a minimum level, the liquid crystal molecules in the vicinity of the vertical orientation films AL1, AL2 gradually return to the vertical state, due to the actions of the vertical orientation films AL1, AL2.

Here, due to the intermolecular force acting between the liquid crystal molecules, the liquid crystal molecules at positions other than the interfaces also gradually return to the vertical state corresponding to a return amount of the liquid crystal molecules at the interfaces and the liquid crystal molecules return to the vertical state as a whole.

To briefly recapitulate the above-mentioned considerations, when the pressing force is applied to a liquid crystal display panel, as shown in FIG. 24B, the intermediate layer MIDL is characterized by the fact that the long axis directions of the liquid crystal molecules are arranged substantially horizontally with respect to each other; and, even when the pressing force is eliminated, the intermediate layer MIDL forms a metastable state in which the intermolecular force acts between the liquid crystal molecules, and, hence, this state is maintained when the electric field is applied to some extent.

The liquid crystal molecules in the vicinity of the interfaces return to the normal orientation direction due to the actions of the vertical orientation films AL1, AL2.

Although the liquid crystal molecules at positions other than the interfaces of the orientation films also return to the original orientation direction correspondingly in a usual case, due to the formation of the intermediate layer MIDL, the intermolecular force to which the liquid crystal molecules at the interface side of the intermediate layer are subjected satisfies the relationship expressed by a following formula (1).

(intermolecular force received from liquid crystal molecules at interface of orientation film)<(intermolecular force received from whole liquid crystal molecules of intermediate layer)+(orientation force in horizontal direction of liquid crystals due to electric field) (1)

Here, all of the liquid crystal molecules of the intermediate layer MIDL assume a substantially horizontal state; and, hence, as a result, the liquid crystal molecules at the interface side of the intermediate layer MIDL also maintain a horizontal state.

In this manner, once the intermediate layer is formed, the term "the intermolecular force received from all of the liquid crystal molecules of the intermediate layer MIDL" is satisfied, and, hence, the intermediate layer MIDL is maintained in the metastable state for a long time. As a result, the liquid crystals exhibit a memory property and generate a state in which a picture can be drawn with the finger, resulting in a drawback as has been explained above.

Such a phenomenon has not been found in any one of the conventional TN type, STN type and lateral electric field type liquid crystal display panels. According to the analysis performed by inventors of the present invention, the reasons for this are as follows.

First of all, in the TN type or STN type liquid crystal display panel, the liquid crystal molecules include a large quantity of chiral material, which is a material which causes twisting of the liquid crystal layer. Accordingly, a mutual intermolecular force acting between the neighboring liquid crystal molecules is extremely strengthened. As a result, even when a state corresponding to the above-mentioned intermediate layer is generated, for example, the intermediate layer is dissipated due to the effect of a large quantity of chiral material.

Further, the liquid crystal molecules in the vicinity of the interfaces of the orientation films are in a horizontal state with a tilting angle of several degrees to ten and some degrees, and the liquid crystal molecules gradually assume the vertical state toward the intermediate portion of the liquid crystal layer when a voltage is applied.

Accordingly, even if the substrate is pushed, the liquid crystal molecules at the intermediate portion assume the lying direction, and, hence, the interaction between the liquid crystal molecules of the intermediate portion and the liquid crystal molecules in the vicinity of the interfaces of the orientation films is increased to the contrary, whereby the intermediate layer is hardly formed in principle.

Further, in the lateral electric field type liquid crystal display panel, since the liquid crystal molecules are arranged substantially in parallel, the intermolecular force between the liquid crystal molecules is structurally strengthened. Further, since the liquid crystal molecules are originally arranged horizontally, even when the substrate is pushed, the pushing force only serves to maintain this horizontal state, so that the intermediate layer is hardly formed.

Accordingly, it can be seen that this phenomenon is a phenomenon peculiar to the vertical orientation type liquid crystal display panel, and, hence, there has been neither a disclosure with respect to the phenomenon, nor the application of counter measures against the phenomenon in the conventional liquid crystal display devices.

Further, as a result of an analysis of the phenomenon as conducted by the inventors of the present invention, the following phenomenon has been discovered.

That is, it has been discovered that the phenomenon depends on the voltage. For example, in a normally black display (black when the voltage is small and white when the voltage is large), it has been found that when the liquid crystal display panel LPNL is pushed while the voltage is in a range of 30% to 100% with respect to the rated voltage, the occurrence of the phenomenon is particularly apparent.

Here, to facilitate an understanding of the foregoing explanation, the case of a normally black display (black when the voltage is small and white when the voltage is large) will be explained in more detail as an example.

However, the case of a normally white display is similarly obtained by reversing the parameters of the normally black display.

FIG. 25A to FIG. 25C are views which show the behavior of the liquid crystal molecules when the applied voltage is in a range of 0% to 30%. Here FIG. 25A shows a state before the liquid crystal display panel LPNL is pushed; FIG. 25B shows a state in which the liquid crystal display panel LPNL is being pushed; and FIG. 25C shows a state which occurs after a pushing force which is applied to the liquid crystal display panel LPNL is released.

In these states, the voltage is small, and, hence, the liquid crystal molecules assume the approximately vertical state. The liquid crystal molecules of the intermediate portion of the liquid crystal layer also assume substantially an approximately vertical state, wherein the long axes of the liquid crystal molecules are directed in the vertical directions with respect to each other.

The following behavior has been discovered.

1) The liquid crystal molecules disposed at the interfaces of the vertical orientation films AL1, AL2 are subjected to the strong interaction from the vertical orientation films AL1, AL2 and maintain the vertical state.

2) The liquid crystal molecules are arranged in the vertical direction, and the intermolecular force acts to maintain the vertical direction.

3) The intensity of the electric field that is generated between the upper and lower substrates is low, and, hence, even when the substrate is pushed, the electric field does not have enough power to shift the liquid crystal molecules from the vertical state to the horizontal state.

Accordingly, the intermediate layer is not formed, so that the liquid crystal molecules return to the original state after the pushing force applied to the substrate is released.

FIG. 26A to FIG. 26C are views showing the behavior of the liquid crystal molecules when the applied voltage is in a range of 70% to 100%. Also in this case, FIG. 26A shows a state before the liquid crystal display panel LPNL is pushed; FIG. 26B shows a state in which the liquid crystal display panel LPNL is being pushed; and FIG. 26C shows a state which occurs after the pushing force applied to the liquid crystal display panel LPNL is released.

In this state, the voltage is high, and, hence, the liquid crystal molecules assume an approximately horizontal state. When the surface of the liquid crystal display panel is pushed, the distance between the substrates is narrowed and the intensity of the electric field is increased. Since the liquid crystal molecules originally assume an approximately horizontal state, along with the increase of the intensity of the electric field derived from narrowing of the distance between the substrates due to pushing of the substrate, the liquid crystal molecules assume a substantially horizontal state in the intermediate portion of the liquid crystal layer. Accordingly, the intermediate layer MIDL is generated, and this intermediate layer MIDL exhibits a memory property.

FIGS. 27A to 27C are views showing the behavior of the liquid crystal molecules when the applied voltage is in a range of 30% to 70%. Also, in this case, FIG. 27A shows a state before the liquid crystal display panel LPNL is pushed; FIG. 27B shows a state in which the liquid crystal display panel LPNL is being pushed; and FIG. 27C shows a state which occurs after the pushing force applied to the liquid crystal display panel LPNL is released.

In this state, the voltage assumes an intermediate level and the liquid crystal molecules assume the intermediate state between the vertical state and the horizontal state. When the surface of the liquid crystal display panel is pushed, this gives rise to a narrowing of the distance between the substrates and an increase in the intensity of the electric field.

Then, the liquid crystal molecules of the intermediate potion assume a substantially horizontally arranged state and hence, the intermediate layer MIDL is formed in the same manner as mentioned above.

On the other hand, the liquid crystal molecules that are disposed in the vicinity of the interfaces of the vertical orientation films AL1, AL2 do not assume the horizontal state, due to the effects of the vertical orientation films AL1, AL2. Therefore, the liquid crystal molecules of the intermediate layer and the liquid crystal molecules disposed at the interfaces differ in the direction of arrangement of the long axes thereof, and, hence, the intermolecular force acting between the liquid crystal molecules in these two regions turns out to be weak. Accordingly, even after pressure is eliminated, the intermediate layer is maintained, and the intermediate layer exhibits a memory property.

The present invention has been made in view of such circumstances and discovery of the characteristics described above, and it is an object of the present invention to provide a liquid crystal display device which can obviate the above-mentioned dark spot phenomenon.

It is another object of the present invention to provide a liquid crystal display device which will effectively utilize the above-mentioned dark spot phenomenon.

As the result of the above-mentioned findings, discoveries and studies made by the inventors, the inventors have adopted the following techniques in accordance with the present invention to solve the above-mentioned drawbacks.

That is, to briefly explain the present invention, in a liquid crystal display device which aligns liquid crystal molecules in the vertical direction, a voltage which is equal to or less than 20% of a maximum voltage is collectively or sequentially applied to AL1 pixels for every other fixed time.

As has been explained in conjunction with the above-mentioned formula (1), the generation of a memory property of the liquid crystal display panel is attributed to the generation of an intermolecular force of the intermediate layer MIDL on the liquid crystal material. However, since this intermolecular force is a force which acts between molecules, the strength thereof assumes a limited value. Accordingly, by decreasing "the orientation force due to an electric field" which is the second term of the right side of the above-mentioned formula, it is possible to establish the relationship "left side>right side" in the formula (1).

In this case, the formation of the intermediate layer MIDL falls in an unstable state in terms of energy, and, hence, the intermediate layer MIDL is dissipated, whereby the liquid crystal molecules return to the normal orientation state, which is determined by the vertical orientation films and the electric field.

In this case, it appears preferable to apply a voltage that is equal to or less than 30% of the maximum voltage. However, since the state of the intermediate layer MIDL exists as a metastable state, the inventors have found that it is preferable to decrease the voltage which forms the electric field to a value equal to or less than 20% of the maximum voltage, so as to eliminate the metastable state.

Then, due to the decrease of the voltage, the electric field is made small, and, hence, the liquid crystal molecules in the vicinity of the interface of the intermediate layer MIDL approach the state in which such liquid crystal molecules are arranged in parallel to the liquid crystal molecules in the vicinity of the vertical orientation film, so that the intermolecular force of the liquid crystal molecules with the intermediate layer MIDL is increased.

As a result, the intermolecular force which the liquid crystal molecules disposed outside the intermediate layer MIDL are subjected to assumes the relationship "(intermolecular force with the liquid crystal molecules at the interface of the orientation film)>(intermolecular force from the liquid crystal molecules of the intermediate layer)"; and, hence, the liquid crystal molecules outside the intermediate layer MIDL are arranged substantially in parallel to the liquid crystal molecules of the interface of the orientation film.

Thereafter, these liquid crystal molecules are sequentially propagated to the next liquid crystal molecules of the intermediate layer and finally the whole intermediate layer recovers to the original alignment state.

It is more desirable to completely dissipate the ability of the electric field to maintain the intermediate layer MIDL. To this end, it is desirable to minimize the electric field, that is, to apply the minimum voltage. With this application of the minimum voltage, it is possible to recover the display in a very short time.

In view of the above, typical aspects of the invention, as disclosed in the present application, will be described as follows.

(1) A liquid crystal display device according to the present invention includes, for example:

a first substrate and a second substrate, which are arranged so as to face each other in an opposed manner, with a liquid crystal material being disposed therebetween; and first electrodes which are formed in a pixel region of a liquid-crystal-side surface of the first substrate, and second electrodes which are formed in a pixel region of a liquid-crystal-side surface of the second substrate, wherein liquid crystal molecules are arranged in a substantially vertical direction with respect to the first and second substrates in a state in which an electric field is not generated between the first electrodes and the second electrodes, and the liquid crystal display device further includes means which, with respect to a voltage applied between the first electrodes and the second electrodes, intermittently applies a voltage which is equal to or less than 20% of the maximum voltage.

(2) A liquid crystal display device of the present invention is, on the premise of the constitution (1), for example, characterized in that, in all or a portion of a liquid crystal display part which is formed of a mass of pixel regions, the voltage being equal to or less than 20% of the maximum voltage, which is applied between the first electrode and the second electrode, is intermittently applied.

(3) A liquid crystal display device of the present invention is, on the premise of the constitution (1), characterized in that the application of the voltage being equal to or less than 20% of the maximum voltage, which is applied between the first electrode and the second electrode, is performed at a rate of not more than 5 times per 1 second.

(4) A liquid crystal display device according to the present invention includes, for example:

a first substrate and a second substrate, which are arranged so as to face each other in an opposed manner, with a liquid crystal material being disposed therebetween; and first electrodes which are formed in a pixel region of a liquid-crystal-side surface of the first substrate, and second electrodes which are formed in a pixel region of a liquid-crystal-side surface of the second substrate, wherein liquid crystal molecules are arranged in a substantially vertical direction with respect to the first and second substrates in a state in which an electric field is not generated between the first electrodes and the second electrodes, and the liquid crystal display device further includes means which, with respect to a voltage applied between the first electrodes and the second electrodes, applies a voltage which is equal to or less than 20% of the maximum voltage in the pixel regions constituting at least a portion of a mass of the pixel regions by one or more times per 1 minute.

(5) A liquid crystal display device according to the present invention includes, for example:

a first substrate and a second substrate, which are arranged so as to face each other in an opposed manner, with a liquid crystal material being disposed therebetween; and first electrodes which are formed in a pixel region of a liquid-crystal-side surface of the first substrate, and second electrodes which are formed in a pixel region of a liquid-crystal-side surface of the second substrate, wherein liquid crystal molecules are arranged in a substantially vertical direction with respect to the first and second substrates in a state in which an electric field is not generated between the first electrodes and the second electrodes, and the liquid crystal display device further includes means which, with respect to a voltage applied between the first electrodes and the second electrodes, applies a voltage which is equal to or less than 20% of the maximum voltage in the pixel regions constituting at least a portion of a mass of the pixel regions by one or more times per 5 seconds.

(6) A liquid crystal display device of the present invention is, on the premise of the constitution (1), for example, characterized in that the respective pixels are arranged in a matrix array, the respective pixels are driven such that driving is sequentially extended from one group of pixels arranged in parallel in one line to another group of pixels which is arranged in parallel to the one group of pixels in a direction which crosses the direction of one line, and a voltage, which is equal to or less than 20% of the maximum voltage, is sequentially applied between the first electrode and the second electrode per one or a plurality of lines.

(7) A liquid crystal display device according to the present invention includes, for example:

a first substrate and a second substrate, which are arranged so as to face each other in an opposed manner, with a liquid crystal material being disposed therebetween; and first electrodes which are formed in a pixel region of a liquid-crystal-side surface a liquid crystal display part of the first substrate, and second electrodes which are formed in a pixel region of a liquid-crystal-side surface of a liquid crystal display part of the second substrate, wherein liquid crystal molecules are arranged in a substantially vertical direction with respect to the first and second substrates in a state in which an electric field is not generated between the first electrodes and the second electrodes, and the liquid crystal display part is divided into a plurality of regions, and the liquid crystal display device further includes means which, with respect to a voltage applied between the first electrodes and the second electrodes formed per one or a plurality of frames, sequentially applies a voltage, which is equal to or less than 20% of the maximum voltage, between the first and second electrodes of the respective pixel regions of the divided regions of the liquid crystal display part per one or a plurality of frames.

(8) A liquid crystal display device of the present invention is, on the premise of the constitution (7), for example, characterized in that, with respect to a voltage applied between the first electrodes and the second electrodes, the sequential application of a voltage which is equal to or less than 20% of the maximum voltage is performed within one minute.

(9) A liquid crystal display device of the present invention is, on the premise of the constitution (7), characterized in that, with respect to a voltage applied between the first electrodes and the second electrodes, the sequential application of a voltage which is equal to or less than 20% of the maximum voltage is performed within 5 seconds.

(10) A liquid crystal display device according to the present invention includes. for example:

a liquid crystal display panel including a first substrate and a second substrate which are arranged so as to face each other in an opposed manner, with a liquid crystal being disposed therebetween, first electrodes which are formed in a pixel region of a liquid-crystal-side surface of the first substrate, and second electrodes which are formed in a pixel region of a liquid-crystal-side surface of the second substrate; and a touch panel which is arranged on an observation-side surface of the liquid crystal display panel; wherein the liquid crystal display device further includes means which, with respect to a voltage applied between the first electrodes and the second electrodes of pixels corresponding to at least a portion of the touch panel which is touched, applies a voltage which is equal to or less than 20% of the maximum voltage.

(11) A liquid crystal display device of the present invention is, on the premise of the constitution (10), for example, characterized in that, with respect to the voltage applied between the first electrodes and the second electrodes of pixels corresponding to at least a portion of the touch panel which is touched, the application of a voltage which is equal to or less than 20% of the maximum voltage is performed when not less than 0.1 seconds lapses after detection of touching.

(12) A liquid crystal display device of the present invention is, on the premise of any one of the constitutions (10) and (11), for example, characterized in that the liquid crystal display panel is configured such that liquid crystal molecules are arranged in a substantially vertical direction with respect to the first and second substrates in a state such that an electric field is not generated between the first electrodes and the second electrodes.

(13) A liquid crystal display device according to the present invention includes, for example:

a liquid crystal display panel including a first substrate and a second substrate which are arranged so as to face each other in an opposed manner, with a liquid crystal material being disposed therebetween, first electrodes which are formed in a pixel region of a liquid-crystal-side surface of the first substrate, and second electrodes which are formed in a pixel region of a liquid-crystal-side surface of the second substrate, the liquid crystal display panel having liquid crystal molecules arranged in a substantially vertical direction with respect to the substrates in a state in which an electric field is not generated between the first electrodes and the second electrodes; and a touch panel which is arranged on an observation-side surface of the liquid crystal display panel; wherein the liquid crystal display device further includes means which, with respect to a voltage applied between the first electrodes and the second electrodes of pixels, applies a voltage signal which is equal to or less than 20% of the maximum voltage in response to detection of touching of the touch panel.

(14) A liquid crystal display device of the present invention is, on the premise of the constitution (13), for example, characterized in that a path of video signals supplied to the first pixel electrodes is interrupted and the supply of the voltage signal which is equal to or less than 20% of the maximum voltage with respect to the voltage applied between the first electrodes and the second electrodes is performed on pixels corresponding to a touched portion and the vicinity thereof based on positional information received from the touch panel.

(15) A liquid crystal display device of the present invention is, on the premise of the constitution (13), for example, characterized in that a path of video signals supplied to the first electrodes is interrupted, and the supply of a voltage signal which is equal to or less than 20% of the maximum voltage with respect to the voltage applied between the first electrode and the second electrode is performed on pixels corresponding to a touched portion, based on positional information from the touch panel.

(16) A liquid crystal display device of the present invention is, on the premise of any one of the constitutions (1) to (9), for example, characterized in that a touch panel is provided at an observation side.

(17) A liquid crystal display device of the present invention is, on the premise of any one of the constitutions (1) to (15), for example, characterized in that a voltage which is equal to or less than 20% of the maximum voltage with respect to the voltage applied between the first electrodes and the second electrodes is a minimum voltage.

(18) A liquid crystal display device of the present invention is, on the premise of any one of the constitutions (1) to (15), for example, characterized in that the liquid crystal display device adopts a normally black mode in which a black display is produced when an electric field is not generated between the first electrodes and the second electrodes.

(19) A liquid crystal display device of the present invention is, on the premise of any one of the constitutions (1) to (15), for example, characterized in that the liquid crystal display device adopts a normally white mode in which a white display is produced when the electric field is not generated between the first electrodes and the second electrodes.

(20) A liquid crystal display device of the present invention is, on the premise of any one of the constitutions (1) to (16), for example, characterized in that the liquid crystal display device adopts a normally black mode in which a black display is produced when the electric field is not generated between the first electrodes and the second electrodes.

(21) A liquid crystal display device of the present invention is, on the premise of any one of the constitutions (1) to (16), for example, characterized in that the liquid crystal display device adopts a normally white mode in which a white display is produced when the electric field is not generated between the first electrodes and the second electrodes.

(22) A liquid crystal display device of the present invention is, on the premise of any one of the constitutions (1) to (15), for example, characterized in that the liquid crystal display device adopts a normally black mode in which a black display is produced when the electric field is not generated between the first electrodes and the second electrodes, and the voltage which is equal to or less than 20% of the maximum voltage with respect to the voltage applied between the first electrodes and the second electrodes of pixels is constituted of a black gray scale signal.

(23) A liquid crystal display device of the present invention is, on the premise of any one of the constitutions (1) to (15), for example, characterized in that the liquid crystal display device adopts a normally white mode in which a white display is produced when the electric field is not generated between the first electrodes and the second electrodes, and the voltage which is equal to or less than 20% of the maximum voltage with respect to the voltage applied between the first electrodes and the second electrodes of pixels is constituted of a white gray scale signal.

(24) A liquid crystal display device of the present invention is, on the premise of the constitution (16), for example, characterized in that the liquid crystal display device adopts a normally black mode in which a black display is produced when the electric field is not generated between the first electrodes and the second electrodes, and the voltage which is equal to or less than 20% of the maximum voltage with respect to the voltage applied between the first electrodes and the second electrodes of pixels is constituted of a black gray scale signal.

(25) A liquid crystal display device of the present invention is, on the premise of the constitution (16), for example, characterized in that the liquid crystal display device adopts a normally white mode in which a white display is produced when the electric field is not generated between the first electrodes and the second electrodes, and the voltage which is equal to or less than 20% of the maximum voltage with respect to the voltage applied between the first electrodes and the second electrodes of pixels is constituted of a white gray scale signal.

The present invention is not limited to the above-mentioned constitutions and various modifications are conceivable without departing from the technical concept of the present invention.

DETAILED DESCRIPTION

Preferred embodiments of a liquid crystal display device according to the present invention will be explained in detail in conjunction with the drawings.

EMBODIMENT 1

<<Schematic Overall Constitution>>

Figure 1A:
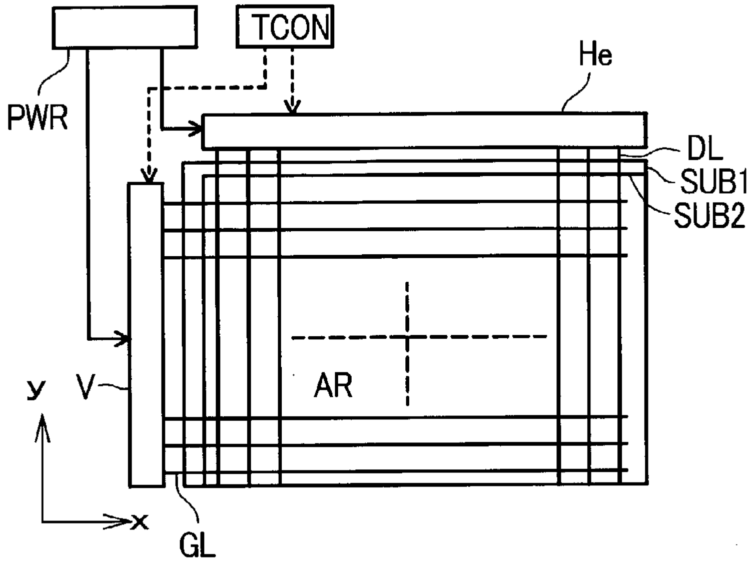
FIG. 1A is a diagrammatic view showing the overall construction of one embodiment of a liquid crystal display device according to the present invention.

FIG. 1A is a schematic diagram showing the overall constitution of one embodiment of the liquid crystal display device according to the present invention.

In FIG. 1A, a pair of transparent substrates SUB1, SUB2 are arranged so as to face each other, with a liquid crystal material being disposed therebetween, wherein the liquid crystal material is hermetically filled in a gap defined between a pair of transparent substrates SUB1, SUB2 are sealed by means of a sealing material (not shown in the drawing), which also performs the function of fixing the transparent substrate SUB2 to the transparent substrate SUB1.

On a liquid-crystal-side surface of the above-mentioned transparent substrate SUB1, in an area surrounded by the sealing material, that are gate signal lines GL, which extend in the x direction and are arranged in parallel in the y direction, and drain signal lines DL, which extend in the y direction and are arranged in parallel in the x direction.

Regions surrounded by respective gate signal lines GL and respective drain signal lines DL constitute pixel regions, and a mass of these respective pixel regions, which are disposed in a matrix array, constitutes a liquid crystal display part AR.

Figure 1B:
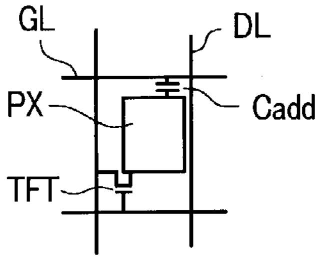
FIG. 1B is a schematic circuit diagram of one pixel of the liquid crystal display device of FIG. 1A.

In each pixel region, as shown in FIG. 1B, a thin film transistor TFT, which is operated in response to a scanning signal supplied from the one-side gate signal line GL, and a pixel electrode PX, to which a video signal is supplied from the one-side drain signal line DL through the thin film transistor TFT, are formed.

An electric field is generated between this pixel electrode PX and a counter electrode (not shown in the drawing), which are formed on a liquid-crystal-side surface of the transparent substrate SUB2 in a form such that the counter electrode is used in common with respective pixel regions, and the optical transmissivity of the liquid crystal is controlled in response to this electric field.

Here, the pixel electrode PX forms a capacitive element Cadd between the pixel electrode PX and the other neighboring gate signal line GL, which is different from the gate signal line GL, for driving the above-mentioned thin film transistor. This capacitive element Cadd is provided for storing the video signal for a relatively long time when the video signal is supplied to the pixel electrode PX.

Respective ends of the gate signal lines GL extend over the sealing material, and the extending ends constitute terminals to which output terminals of a vertical scanning drive circuit V are connected. Further, to input terminals of the vertical scanning drive circuit V, signals are inputted from a printed circuit board that is arranged outside the liquid crystal display panel, for example.

The vertical scanning drive circuit V is constituted of a plurality of semiconductor devices, for example, and a plurality of neighboring gate signal lines GL are formed into a group, and one semiconductor device is allocated to each group.

In the same manner, respective one ends of the drain signal lines DL also extend over the sealing material SL, and the extending ends thereof constitute terminals to which output terminals of the video signal drive circuit He are connected. Further, to input terminals of the video signal drive circuit He, signals are inputted from a printed circuit board that is arranged outside the liquid crystal display panel.

The video signal drive circuit He is also constituted, of a plurality of semiconductor devices, for example, and a plurality of neighboring drain signal lines DL are formed into a group, and one semiconductor device is allocated to each group.

Further, counter voltage signal lines CL are connected in common at a right-side end portion, as seen in the drawing, and a connection line extends over the sealing material, and the extending end constitutes a terminal. A voltage which becomes a reference with respect to the video signals is supplied from this terminal.

To the scanning signal drive circuit V and the video signal drive circuit He, a power supply and control signals are respectively inputted from a power source circuit PWR and a control circuit TCON.

With respect to respective gate signal lines GL, they are sequentially selected one by one in response to receipt of the scanning signals from a vertical scanning drive circuit V.

Further, to respective drain signal lines DL, the video signals are supplied from the video signal drive circuit He at the timing at which the gate signal lines GL are selected.

Here, in the above-mentioned embodiment, the vertical scanning drive circuit V and the video signal drive circuit He are constituted of semiconductor devices mounted on the transparent substrate SUB1. However, these drive circuits may be constituted of so-called tape carrier type semiconductor devices, which are connected beside the transparent substrate SUB1 and the printed circuit board, for example. Further, when semiconductor layers of the thin film transistors TFT are formed of polycrystalline silicon (p-Si), semiconductor elements made of polycrystalline silicon may be formed on a surface of the transparent substrate SUB1 together with a wiring layer.

<<Constitution of a Pixel>>

Figure 1C:
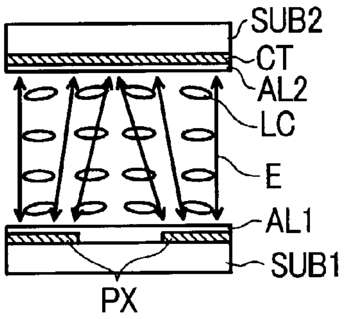
FIG. 1C is a cross-sectional view of a portion of the display panel of FIG. 1A.

FIG. 1C is a cross-sectional view showing one embodiment of the constitution of the above-mentioned pixel region. Here, in FIG. 1C, an illustration of the gate signal lines GL, the drain signal lines DL, the thin film transistors TFT and the like are omitted, and only the pixel electrode PX in the pixel region and the counter electrode CT or the like are shown.

The pixel electrode PX is formed in the pixel region on the liquid-crystal-side surface of the transparent substrate SUB1, and the pixel electrode PX is formed of a light transmitting conductive layer which is made of, for example, ITO (Indium Tinoxide), ITZO (IndiumTinZincOxide), IZO (Indium ZincOxide), $S_nO_2$ (Tin Oxide), $In_2O_3$ (Indium Oxide) or the like. In this case, the pixel electrode PX is not formed on the whole surface of the pixel region, so that the pixel region has a portion where the pixel electrode PX is not formed.

On upper surfaces of these pixel electrodes PX, an orientation film AL1 is formed, such that the orientation film AL1 also covers the pixel electrodes PX. The orientation film AL1 is constituted of a resin film having no so-called rubbing treatment on an upper surface thereof.

Further, on a liquid-crystal-side surface of the transparent substrate SUB2, which is arranged to face the transparent substrate SUB1 in an opposed manner with liquid crystal material disposed therebetween, the counter electrode CT, which is provided in common with respective pixels, is formed. The counter electrode CT is formed of a light-transmitting conductive layer in the same manner as the above-mentioned pixel electrodes PX. An orientation film AL2 is formed on an upper surface of the counter electrode CT, such that the orientation film AL2 also covers the counter electrode CT. The orientation film AL2 is formed of a resin film having an upper surface which is not subjected to so-called rubbing treatment.

Here, FIG. 1C depicts the behavior of the liquid crystal molecules when a slight electric field E is generated between the pixel electrodes PX and the counter electrode CT. When the electric field E is not generated, the liquid crystal molecules are arranged in the vertical direction with respect to the transparent substrates SUB1, SUB2 by the above-mentioned orientation films AL1, AL2.

<<Video Signal>>

Figure 1D:
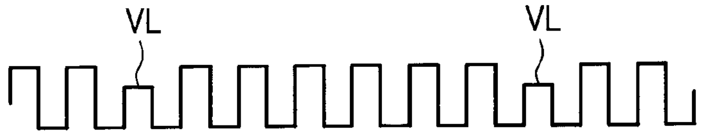
FIG. 1D is a waveform diagram of the video signal supplied to each video signal line in the display device of FIG. 1A.

FIG. 1D shows a video signal that is supplied to each video signal line DL from the video signal drive circuit He. For the sake of brevity, a video signal which is formed by sequentially repeating signals having the lowest voltage and the highest voltage is shown. Accordingly, a voltage signal which indicates a gray scale is not shown. Here, the video signal shown in FIG. 1D indicates a voltage difference with respect to the reference voltage supplied to the counter electrode CT. That is, the video signal is also understood as representing a voltage difference between the counter electrode CT and the pixel electrode PX.

Then, as the video signal, a signal VL having a voltage equal to or less than 20% with respect to the maximum voltage is supplied periodically. This voltage VL, which is equal to or less than 20% with respect to the maximum voltage, is used as a signal for erasing an unexpected dark spot at a portion of the liquid crystal display part AR of the liquid crystal display device, which dark spot occurs when the portion is touched with a finger.

Figure 2:
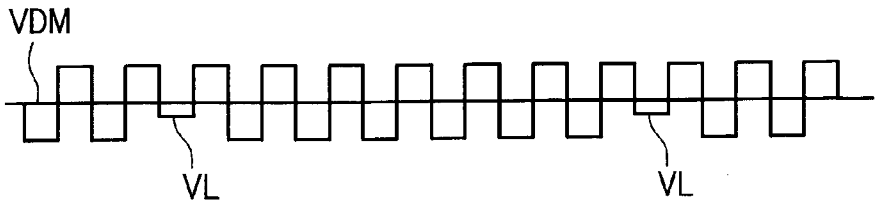
FIG. 2 is a waveform diagram of a signal inputted to a drain signal line in another embodiment of the liquid crystal display device according to the present invention.
Figure 3:
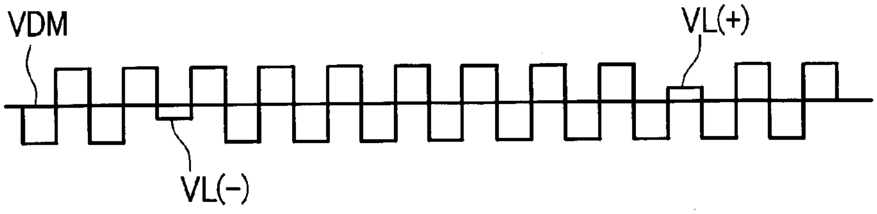
FIG. 3 is a waveform diagram of a signal inputted to a drain signal line in another embodiment of the liquid crystal display device according to the present invention.

Here, although the video signal shown in FIG. 1D is represented as a video signal which uses a reference signal supplied to the counter electrode CT as a reference, it is needless to say that the video signal is not limited to such a video signal, and, as shown in FIG. 2, a signal which has a voltage VL of equal to or less than 20% with respect to the maximum voltage may be mixed in the video signal periodically with respect to a center voltage VDM of the video signal. Further, as shown in FIG. 3, it is needless to say that a voltage VL(+), which has the polarity thereof set to a positive value, and a voltage VL(−), which has the polarity thereof set to a negative value, with respect to the center voltage VDM may be alternately inserted in the video signal in a periodic manner.

In the above-mentioned embodiments, as the liquid crystal display device, a liquid crystal display device of the normally black type, for example, is used. Here, "normally black" implies a mode in which a black display is produced in a state in which the electric field is not applied between the pixel electrode PX and the counter voltage CT.

Then, periodically, the voltage equal to or less than 20% of the maximum voltage, that is, the voltage which produces the black display, is applied to respective video signal lines DL as a voltage for performing an erasing operation.

Due to such a constitution, even when the liquid crystal display part AR of the liquid crystal display device is touched with a finger by chance, it is possible to erase the stored image within a fixed time, whereby a normal display can be realized.

Further, in this embodiment, the application of the voltage for effecting erasing per pixel is performed twice or less times within one second. Usually, the liquid crystal display device is driven at a frame frequency equal to or more than 60 Hz. This implies that the voltages are written in each pixel 60 times within 1 second.

On the other hand, the human eye has visual characteristics such that an image which lasts for a period of equal to or less than 1/24 seconds cannot be recognized as an independent image. For example, a video method, in which the display of different still images 24 times per one second gives the human eye an illusion that a mass of still pictures is not recognized as still pictures, but is recognized as a continuous image, is widely known as animation.

Accordingly, even when the voltage used for erasing is added at the frequency of not less than twice a second, that is, equal to or less than once in 30 times, the image generated by the voltage for erasing is not recognized by the human eye.

Accordingly, in this embodiment, it is possible to realize a dissipation of a memory image in a vertical orientation type display without making the user aware of the insertion of the image.

Further, it is preferable that the insertion frequency of the voltage used for erasing is equal to or more than once per minute. This is because the phenomenon can be erased before the user starts to have an idea that the phenomenon is a defect, and, hence, it is possible to prevent the user from having an undesired misgiving about the phenomenon.

Further, it is preferable to perform the insertion of a voltage for erasing once in five seconds. When the liquid crystal panel is pushed, the distance between the substrates is narrowed and then gradually recovers to the original distance. During the period until the distance recovers to the original distance, the distance between the substrates differs for that region compared to other regions, and, hence, the display image in the region appears differently. This is a phenomenon which also occurs in liquid crystal display devices other than a vertical orientation type display device.

Accordingly, when the voltage used for erasing is added at a frequency equal to or less than once in 5 seconds, it is difficult to distinguish the phenomenon from the usual phenomena which occurs in liquid crystal display devices other than the vertical orientation type liquid crystal display device, and, hence, the user cannot perceive the existence per se of this phenomenon.

Further, with respect to the display mode, this embodiment is applicable to either one of 1) a normally white mode in which the display is bright when the voltage is small and is dark when the voltage is large and 2) a normally black mode in which the display is dark when the voltage is small and is bright when the voltage is large.

Here, when the present invention is applied to the case 2), the brightness is lowered by the application of the voltage for erasing by an amount corresponding to the period in which the voltage for erasing is applied. However, since the frequency of application of the voltage for erasing is small, the amount by which the brightness is lowered is extremely trivial.

Further, when the present invention is applied to the case 1), the brightness is increased by the application of the voltage for erasing by an amount corresponding to the period in which the voltage for erasing is applied, and the increase of brightness gives rise to lowering of the contrast ratio. Accordingly, it is preferable to set the frequency to about once in 5 seconds or about once in 5 seconds to 1 minute.

Figure 4:
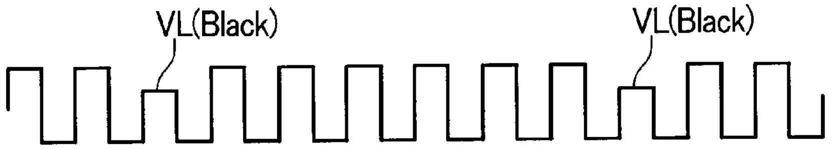
FIG. 4 is a waveform diagram of a signal inputted to a drain signal line in another embodiment of the liquid crystal display device according to the present invention.

Here, as shown in FIG. 4, it is needless to say that a gray scale display, corresponding to the voltage of equal to or less than 20% of the maximum voltage, can be produced using the signal for erasing. That is, by using the voltage or the gray scale corresponding to white in the normally white mode and by using the voltage or the gray scale VL (Black) corresponding to black in the normally black mode for erasing, the time necessary, for erasing can be further shortened.

EMBODIMENT 2

Figure 5:
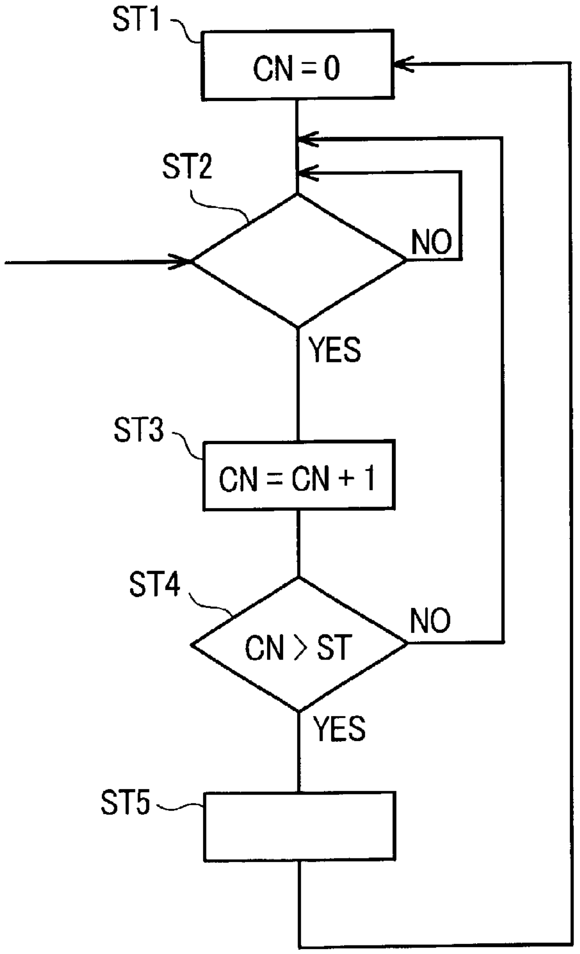
FIG. 5 is a flowchart showing an operation of a control circuit in another embodiment of the liquid crystal display device according to the present invention.

FIG. 5 is directed to an embodiment of the liquid crystal display device according to the present invention, and, more specifically, it is a flow chart showing the operation for inputting data for erasing. Operations executed in accordance with the flow chart are controlled by the above-mentioned control circuit TCON.

In FIG. 5, first of all, the counter CN is set to the state "0" in step 1 (ST1), and, thereafter, it is judged whether a synchronous signal is inputted or not in step 2 (ST2).

When the synchronous signal is inputted, 1 is added to the counter value CM in step 3 (ST3), and it is judged whether the value is greater than a set value ST or not in step 4 (ST4).

When the value is not greater than the set value, the processing returns to step 2 (ST2), and the processing waits for the inputting of the next synchronous signal.

When the value is greater than the set value, the processing replaces a video signal with data for erasing in step S (ST5), and the processing returns to step 1 (ST1) and resets the counter to the state "0". Hereinafter, the same operation is repeated.

Here, any signal may be used as the synchronous signal provided that the signal is responsive to a lapse in time based on the count number. Further, the set value is a value which sets a given time, in which the data for erasing is outputted, as a value corresponding to the count number of the synchronous signal.

Figure 6:
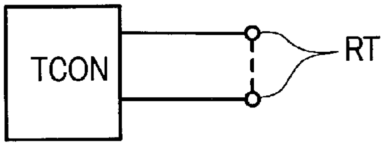
FIG. 6 is a block diagram showing another embodiment of a control circuit of the liquid crystal display device according to the present invention.

In this case, the set value may be set externAlly with respect to the control circuit TCON. For example, setting terminals RT may be provided for the control circuit TCON, as shown in FIG. 6, and the set value may be changed by short-circuiting these terminals or releasing the short-circuiting. In such a case, irrespective of the use of either the normally white mode or the normally black mode, for example, it is possible to cope with these modes using one type of TCON.

EMBODIMENT 3

Figure 7:
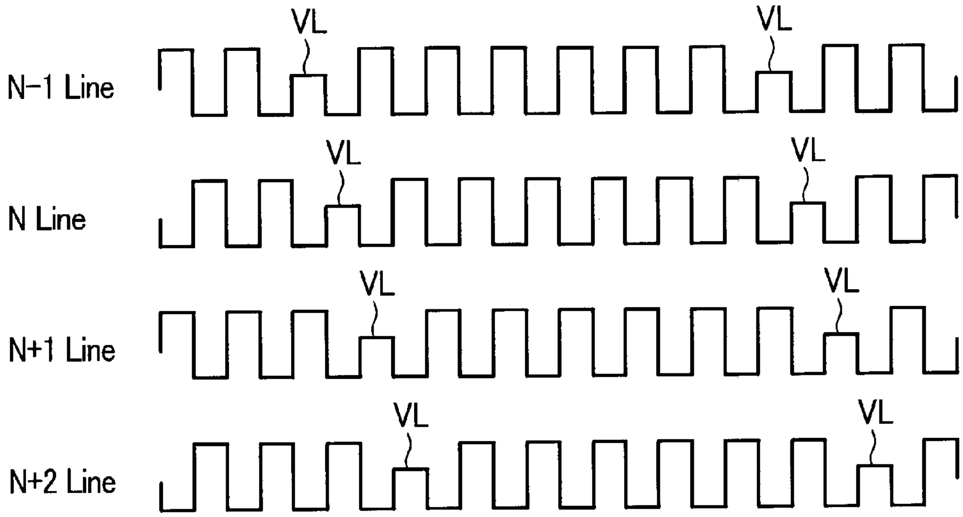
FIG. 7 is a waveform diagram showing a signal inputted to a drain signal line per line unit in another embodiment of the liquid crystal display device according to the present invention.

FIG. 7 is a view showing the manner of supplying a video signal in which the data for erasing is mixed. In FIG. 7, the data for erasing is inputted to the drain signal line DL for every 1 line, and, as a result, the data for erasing is inputted to all lines by sequentially scanning the gate signal lines GL. Here, "1 line" implies each pixel group driven by a scanning signal of one gate signal line GL.

Figure 8:
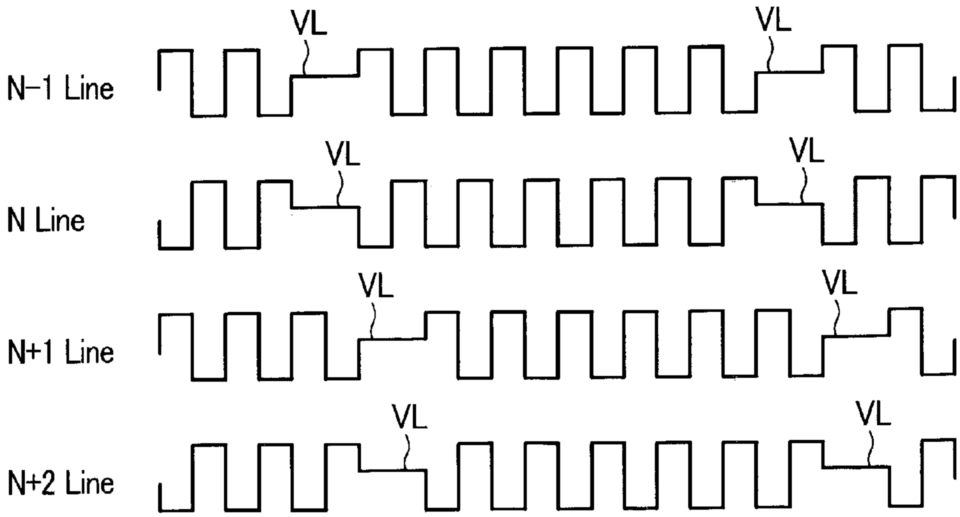
FIG. 8 is a waveform diagram showing a signal inputted to a drain signal line per a plurality of line units in another embodiment of the liquid crystal display device according to the present invention.

As shown in FIG. 8, the data for erasing may be applied to the drain signal line DL for every plurality of lines. Due to such a provision, it is possible to shorten the display time of the data for erasing. In this case, the data for erasing may be displayed for a longer time.

Figure 9:
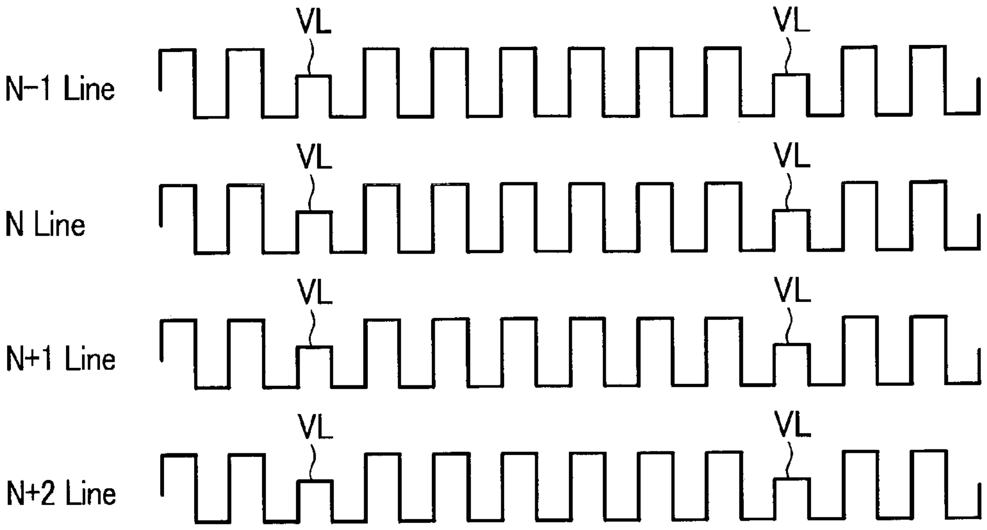
FIG. 9 is a waveform diagram showing a signal inputted to all drain signal lines simultaneously is another embodiment of the liquid crystal display device according to the present invention.

Further, as shown in FIG. 9, the data for erasing may be simultaneously inputted to all drain signal lines DL. Due to such a provision, the display time of the data for erasing can be further shortened.

EMBODIMENT 4

Figure 10A:
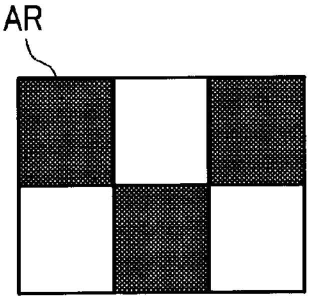
FIG. 10A and FIG. 10B are diagrams showing a signal inputted to a drain signal line per frame in another embodiment of the liquid crystal display device according to the present invention.
Figure 10B:
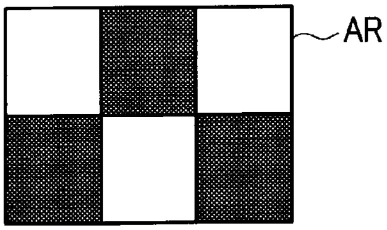

FIGS. 10A and 10B are diagrams showing the manner of supplying data for erasing.

As shown in FIGS. 10A and 10B, a liquid crystal display part AR is divided into a plurality of (for example, six in the drawing) regions, and the data for erasing is applied per region.

In this case, for example, in a first frame shown in FIG. 10A, the data for erasing is inputted to three regions which are not close to each other among six respective divided regions. Then, in a next frame, as shown in FIG. 10B, the data for erasing is inputted to the remaining three regions, other than the above-mentioned three regions, and these inputting operations are repeated thereafter.

Due to such operations, the regions to which the data for erasing is inputted are selected in a random manner, and, hence, it is possible to make it difficult to recognize the display periodically the data for erasing with the human eye.

Figure 11A:
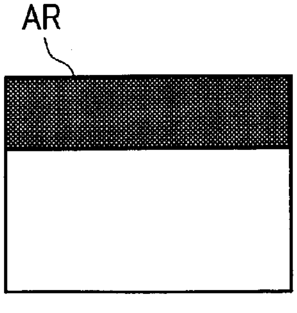
FIG. 11A to FIG. 11C are diagrams showing, for another embodiment of the liquid crystal display device according to the present invention, a display produced by a signal inputted to a drain signal line per frame.
Figure 11B:
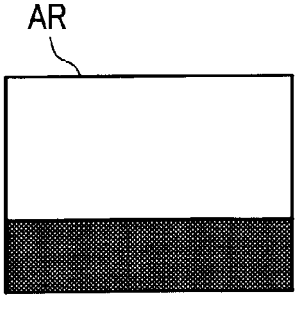
Figure 11C:
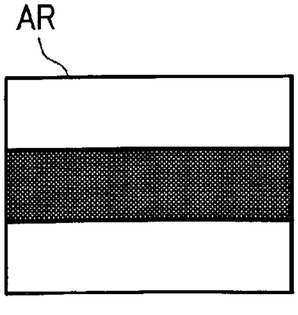

In the same manner, as shown in FIG. 11A to FIG. 11C, the liquid crystal display part AR may be divided into three regions which are arranged in parallel in the y-axis direction, for example. In this case, the data for erasing may be inputted to one region out of three respective divided regions in a first frame, as shown in FIG. 11A. Then, the data for erasing is inputted to one region of the two remaining regions in a next frame, as shown in FIG. 11B. Further, the data for erasing is inputted to the last of the regions in the next frame, as shown in FIG. 11C. Thereafter, these inputting operations may be repeated.

Both of these constitutions can be easily realized by expanding the functions of the control circuit TCON.

EMBODIMENT 5

Figure 12:
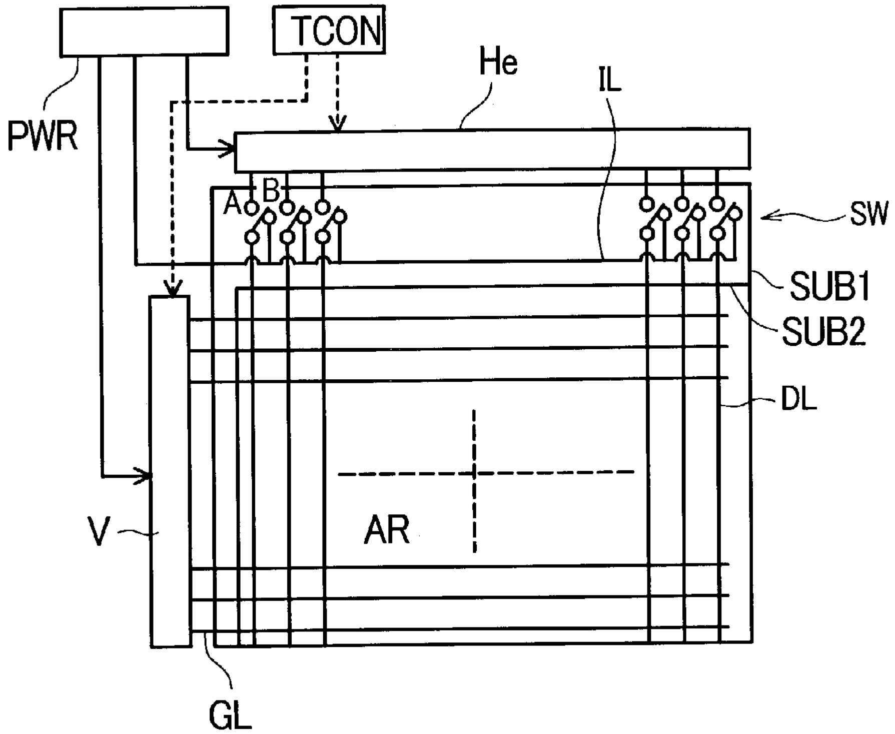
FIG. 12 is a schematic diagram showing another embodiment of the liquid crystal display device according to the present invention.

FIG. 12 is a schematic diagram showing another embodiment of the liquid crystal display device according to the present invention, in which the layout corresponds to that of FIG. 11A.

This embodiment is different from the embodiment. 1 shown in FIG. 1A in that, in a region between the video signal drive circuit He and the liquid crystal display part AR, switching elements SW, which are constituted of thin film transistors, for example, are provided to respective drain signal lines DL in an interposed manner. These respective switching elements are configured such that the respective drain signal lines DL are connected to the video signal drive circuit He in one changeover position and the respective drain signal lines DL at the liquid crystal display part AR side are connected to an erasing signal line IL, to which an erasing potential VL is supplied, in another changeover position. The erasing signal line IL is held at the erasing potential by a power source circuit PWR.

Figure 13A:
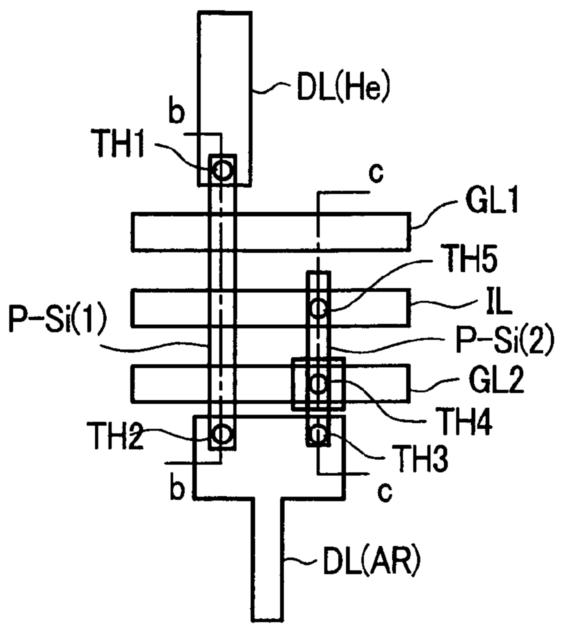
FIG. 13A is a plan view showing one embodiment of the switching element SW shown in FIG. 12.
Figure 13B:
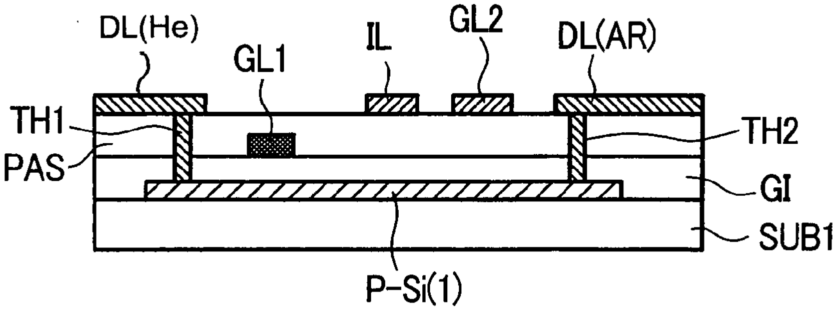
FIG. 13B is a cross-sectional view taken along a line b—b in FIG. 13A
Figure 13C:
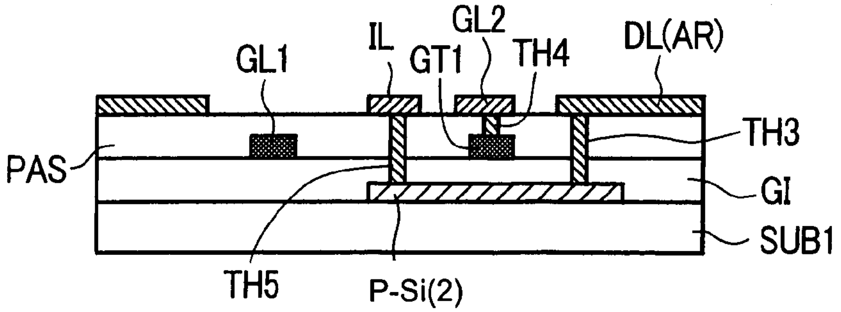
FIG. 13C is a cross-sectional view taken along a line c—c in FIG. 13A.

That is, compared to the preceding embodiment in which the data for erasing is supplied to the respective drain signal lines DL from the video signal drive circuit He, in this embodiment, the data for erasing is supplied to respective drain signal lines DL through the switching elements SW by driving the switching elements SW shown in FIG. 12. FIG. 13A is a plan view showing one embodiment of the switching element SW. FIG. 13B is a cross-sectional view taken along a line b—b in FIG. 13A, and FIG. 13C is a cross-sectional view taken along a line c—c in FIG. 13A.

Here, the switching element SW is constituted of a thin film transistor TFT1, wherein a semiconductor layer thereof is made of polycrystalline silicon. Further, when the semiconductor layers of the thin film transistors TFT of respective pixels and the semiconductor layers of the C-MIS type transistors formed in the scanning signal drive circuit V and the video signal drive circuit He are made of polysilicon, the thin film transistors TFT1 of the switching elements SW are formed along with the formation of the thin film transistors TFT of these respective pixels and the C-MIS type transistors.

First of all, on the upper surface of the transparent substrate SUB1, polycrystalline silicon layers P-Si(b) and P-Si(2) are formed. On upper surfaces of these polycrystalline silicon layers P-Si(1) and P-Si(2), an insulation film GI is formed such that the insulation film GI covers these polycrystalline silicon layers P-Si(1) and P-Si(2).

On an upper surface of the insulation film GI, first gate electrode signal lines GL1 are formed such that the first gate electrode signal lines GL1 traverse the polycrystalline silicon layer P-Si(I), and second gate signal lines GL2 are formed such that the second gate electrodes GT2 traverse the polycrystalline silicon layer P-Si(2). Here, the first gate electrode signal line GL1 is configured to function also as the first gate electrode at a portion where the first gate electrode signal line GL1 traverses the polycrystalline silicon layer P-Si(h).

Further, a protective film PAS is formed such that the protective film PAS covers the first gate electrode signal lines GL1 and the second gate signal lines GL2.

On an upper surface of this protective film PAS, the drain signal lines DL(He), which are arranged at the video signal drive circuit He side and are connected to one ends of the above-mentioned polycrystalline silicon layers P-Si(I), and the drain signal lines DL (AR), which are arranged at the liquid crystal display part AR side and are connected to another ends of the above-mentioned polycrystalline silicon layers P-Si(I), are formed. These respective connections are established by means of through holes TH1, TH2 which are formed in the protective film PAS and the insulation film GI in a penetrating manner.

On an upper surface of this protective film PAS, there are the drain signal lines DL(He), that are arranged at the video signal drive circuit He side and are connected to one end of the above-mentioned polycrystalline silicon layers P-Si(I) and the drain signal lines DL(AR), that are arranged on the liquid crystal display part AR side and are connected to the other end of the polycrystalline silicon layers P-Si(I), the respective connections being made by means of through holes TH1, TH2. Similarly, the erasing signal lines IL, which are connected to one end of the above-mentioned polycrystalline silicon layers P-Si(2) on the upper surface of the protective film PAS, the other end of which is connected to the drain signal lines DL(AR), also are formed. The respective connections are established by means of through holes TH3, TH5 in this case, which are formed in the protective film PAS and the insulation film GI in a penetrating manner.

The second gate electrode signal lines GL2 are connected to the second gate electrodes GT1. This connection is established by through holes TH4 formed in the protective film PAS.

Here, the first gate electrode signal lines GL1, the erasing signal lines IL, the second gate electrode signal lines GL2, as described above, are respectively formed in common with those of other switching elements SW and run orthogonal to the respective drain signal lines DL.

Due to the switching elements SW having such a constitution, when an ON signal is supplied to the first gate electrode signal line GL1 and an OFF signal is supplied to the second gate electrode signal line GL2, video signals are supplied to respective drain signal lines DL at the liquid crystal display part AR side from the video signal drive circuit He. Then, when an OFF signal is supplied to the first gate electrode signal line GL1 and an ON signal is supplied to the second gate electrode signal line GL2, the data for erasing is supplied to respective drain signal lines DL at the liquid crystal display part AR side from the erasing signal line IL.

Here, although polycrystalline silicon is used as the material of the semiconductor layer of the switching element SW in the above-mentioned embodiment, the material of the semiconductor layer is not limited to the use of polycrystalline silicon, and it is needless to say that continuous boundary silicon or pseudo single crystal silicon also may be used. It is also needless to say that the respective embodiments of the present invention may adopt thin film transistors TFT made of amorphous silicon.

EMBODIMENT 6

Figure 14:
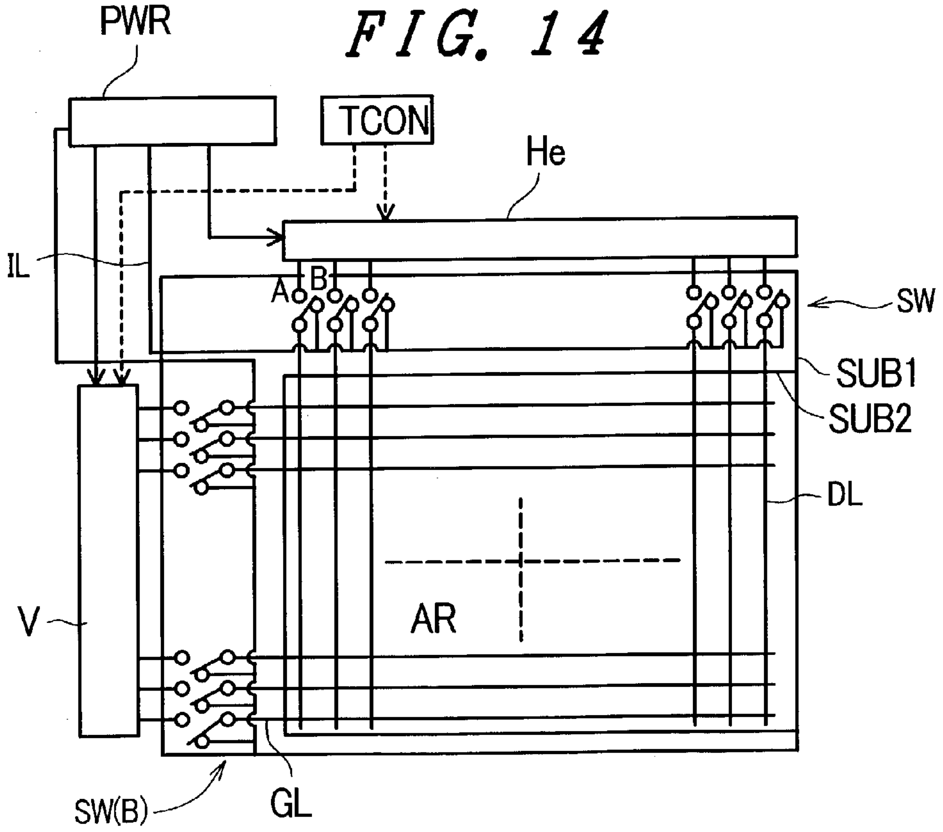
FIG. 14 is a constitutional view showing another embodiment of the liquid crystal display device according to the present invention.

FIG. 14 is a schematic diagram showing another embodiment of the liquid crystal display device according to the present invention, the layout of which corresponds to that of FIG. 12.

This embodiment is different from the constitution shown in FIG. 12 in that, in the region defined by the scanning signal drive circuit V and the liquid crystal display part AR, switching elements SW (B), which are constituted of thin film transistors, for example, are formed on respective gate signal lines GL in an interposed manner, wherein each switching element SW (B) can establish the connection with each signal line DL at one changeover position and can release the connection with each signal line DL at another changeover position.

A signal line GL3 for turning ON the gates from a power source circuit PWR is formed as extensions of respective switching elements SW (B). Due to such a constitution, it is possible to realize the collective erasing of the whole screen.

EMBODIMENT 7

Figure 15:
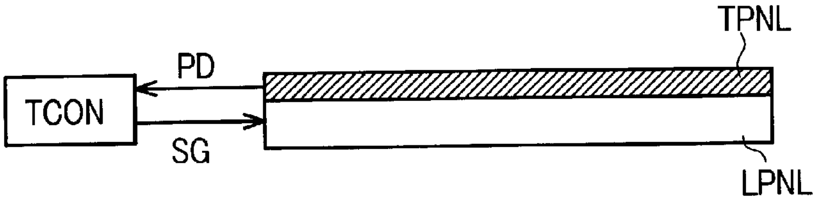
FIG. 15 is a schematic diagrams showing another embodiment of the liquid crystal display device according to the present invention.

FIG. 15 is a diagram showing another embodiment of the liquid crystal display device according to the present invention.

This liquid crystal display device is configured such that, on an observation-side surface of a liquid crystal display panel LPNL, a touch panel TPNL is arranged such that the touch panel TPNL covers at least the liquid crystal display part AR.

The touch panel TPNL is constituted such that, when a location on the surface thereof is pushed with a pen or the like, for example, positional information PD which locates such a pushed portion is outputted, and various manipulations are reflected on the display of the liquid crystal display panel LPNL based on the positional information.

The touch panel TPNL may be constituted, for example, such that, on a surface thereof, a plurality of first signal lines, which extend in the x direction and are arranged in parallel in the y direction, and a plurality of second signal lines, which extend in the y direction and are arranged in parallel in the x direction, are formed in the usually insulated manner, wherein, when a portion of the touch panel TPNL is pushed, a signal line constituting the first signal line and a signal line constituting the second signal line at that position are short-circuited, and the short-circuiting is inputted together with the positional information.

Further, when the liquid crystal display panel LPNL is used in the above-mentioned liquid crystal display device, and when the pressure is applied to the liquid crystal display part AR, a "dark spot" is generated at the location where the pressure is applied.

This embodiment is provided for preventing the "dark spot" which is generated on the liquid crystal display panel LPNL when the touch panel TPNL is pushed with a pen or the like and the pressure is transmitted to the liquid crystal display panel LPNL.

That is, as shown in FIG. 15, this embodiment is characterized in that the control circuit TCON detects the positional information PD from the touch panel TPNL, which is pushed with a pen or the like and, thereafter, the control circuit TCON replaces the video signal SG supplied to the pixel corresponding to the position with a modified video signal VLP, which is a voltage of equal to or less than 20% of the maximum voltage based on the positional information.

Figure 16A:
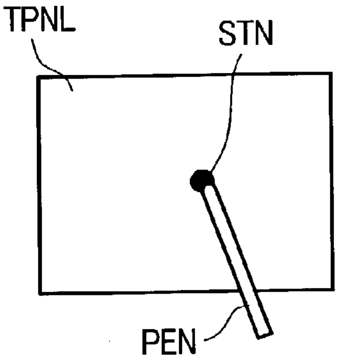
FIG. 16A to FIG. 16C are diagrams showing an operation of the liquid crystal display device shown in FIG. 15.
Figure 16B:
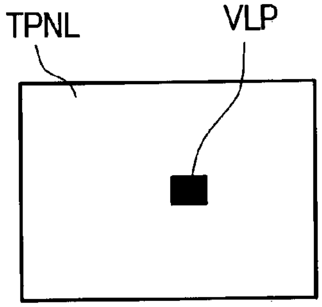
Figure 16C:
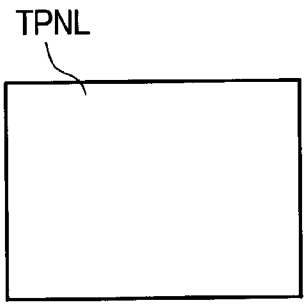

Due to such a constitution, as shown in FIG. 16A, FIG. 16B and FIG. 16C, although a dark spot STN is generated temporarily at the portion of the touch panel TPNL which is pushed with the pen or the like, the dark spot STN disappears thereafter, and the touch panel TPNL recovers to the normal screen.

FIG. 16A shows a state in which the touch panel TPNL is touched with a pen, FIG. 16B shows a state in which the modified video signal, which is set to a value equal to or less than 20% of the maximum voltage, is displayed in a rectangular shape, for example, in the touched region, and FIG. 16C indicates a state in which the dark spot STN disappears due to the display of the modified video signal VLP and the display returns to a normal mode.

Although liquid crystal display devices which are provided with a touch panels on whole the surface of the liquid crystal display device are widely known, a point which is shared by these liquid crystal display devices in common is that they require an operation to push the touch panel using a pen or a finger. As a result, as one example, a change of conductive state or a change of capacitance is generated between the above-mentioned electrodes constituted in a matrix array, and this change is detected by a detection circuit provided around the touch panel, whereby the touched position on the screen is specified.

However, due to such a pushing operation, pressure is applied to the liquid crystal display panel, and a memory image is generated. The liquid crystal display device equipped with a touch panel is a display device which inherently requires a pushing operation. However, the degree of the pushing force applied to the touch panel depends on individual users, and, hence, it is difficult to estimate the pressure applied to the liquid crystal display panel. Accordingly, to mount the touch panel on a vertical orientation type liquid crystal display device and to always provide a stable display, a constitution which can eliminate the above-mentioned memory property becomes necessary.

Here, by constituting at least one of the above-mentioned respective embodiments as a touch panel attached liquid crystal display device, it is possible to obtain a liquid crystal display device which exhibits a stable display, while adopting the vertical orientation type.

Then, in the touch panel method, the positional information of the portion to which the pressure is applied is specified and the memory images are generated only in the touched region, and, hence, it is sufficient to apply the voltage of equal to or less than 20% of the maximum voltage only to the touched region.

In this case, it is sufficient to set the image data at the region corresponding to the address and in the vicinity thereof to the voltage of equal to or less than 20% of the maximum voltage, and, hence, the data can be replaced using the control circuit TCON, whereby the liquid crystal display device can have a simple constitution.

In a simplified mode, the white gray scale mode is adopted for a normally white display, and the black gray scale is adopted for a normally black display.

Here, it is needless to say that the replacement of video signals may be performed continuously when the positional information from the touch panel TPNL is added.

EMBODIMENT 8

Figure 17A:
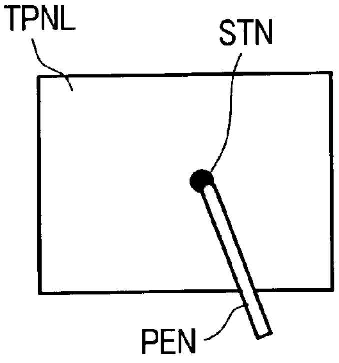
FIG. 17A to FIG. 17C are diagrams showing an operation in another embodiment of the liquid crystal display device according to the present invention.
Figure 17B:
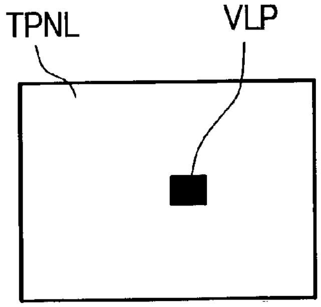
Figure 17C:
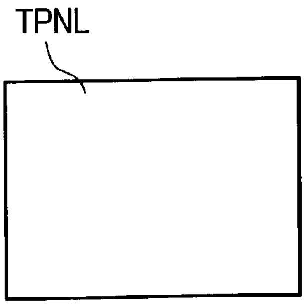

FIGS. 17A to 17C are diagrams relating to another embodiment of the liquid crystal device according to the present invention.

The constitution which makes this embodiment different from the embodiment shown in FIG. 16 lies in the fact that the "dark spot" is erased within a time at least equal to or more than 0.1 seconds after the touch panel TPNL is pushed with a pen or the like. That is, when the touch panel TPNL is pushed with the pen or the like, the control circuit TCON detects the positional information, and, after a lapse of equal to or more than 0.1 seconds from the detection, the control circuit TCON transmits the data for erasing to the liquid crystal display panel LPNL.

Figure 18:
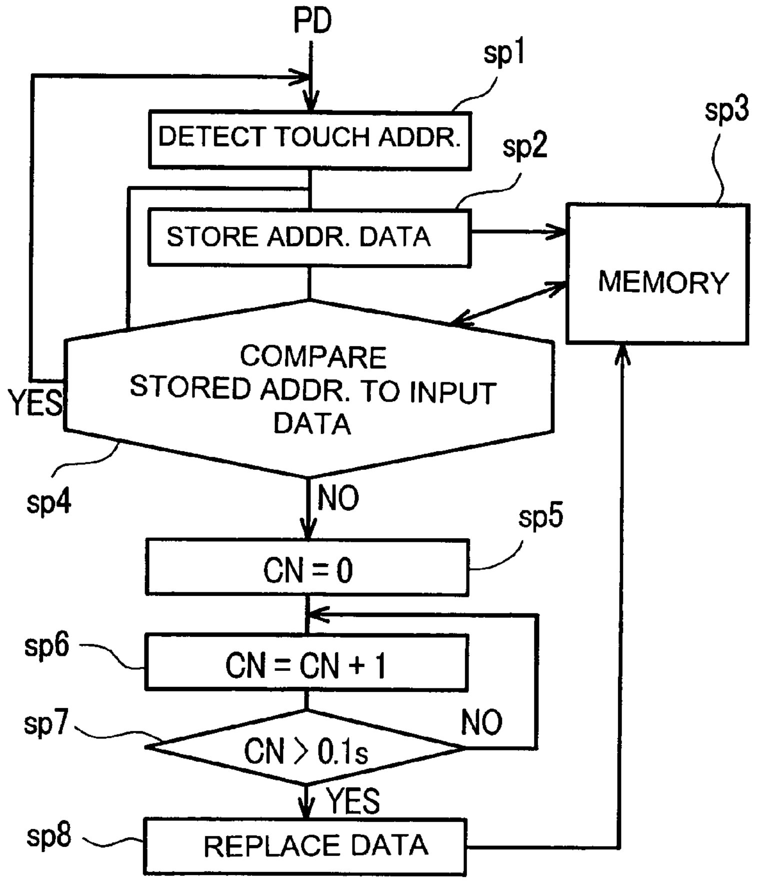
FIG. 18 is a flow chart showing one embodiment of an operation of a control circuit of the liquid crystal display device shown in FIG. 15.

FIG. 18 is a flow chart showing one embodiment of an operation performed by the control circuit TCON.

In the drawing, first of all, in step SP1, a touch address is detected based on the information PD from the touch panel TPNL. Thereafter, in step SP2, address data is stored in a memory indicated by SP3.

Then, in step SP4, the stored address and the input data are compared. That is, the address stored in the memory SP3 and the inputted address data are compared, and it is determined whether the stored address data and the inputted address data coincide with each other or not. Then these data do not coincide, the counter CM is reset to "0" in step SP5 and the count number is added along with inputting of data at step SP6.

When the count number assumes a value which corresponds to 0.1 seconds in step 5P7, the video signal data of the region corresponding to the address stored in the memory SP3 is replaced with the data for erasing in step SP8.

When the stored address data is inputted in step SP4, the processing returns to the step SP1, and the processing is repeated until the stored address data is no more inputted.

Since the touching operation of the touch panel TPNL is performed by a human, the time during which the pressure is applied to the touch panel TPNL by the touching operation is not a moment, but is a continuous time having a finite value.

Even when the screen is erased during touching, the memory function is generated, and, hence, it is not so effective. Accordingly, to add the data for erasing after completion of touching, it is desirable to perform the setting of data for erasing after a time equal to or more than 0.1 second lapses. Accordingly, it is possible to surely erase the region from the screen immediately after the completion of touching.

EMBODIMENT 9

FIGS. 19A to 19D are diagrams relating to another embodiment of the liquid crystal display device according to the present invention.

Figure 19A:
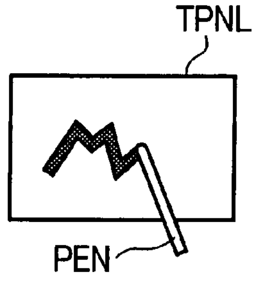
FIG. 19A to FIG. 19D are diagrams showing operations in another embodiment of the liquid crystal display device according to the present invention.
Figure 19B:
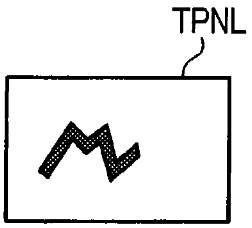

This embodiment is different from the embodiment shown in FIG. 17 in that, first of all, when the touch panel TPNL is traced with a pen or the like, as shown in FIG. 19A, a locus drawn by the pen or the like appears as it is as a display, as shown in FIG. 19B. Although this display constitutes the above-mentioned "dark spot", this embodiment is characterized by effectively using the dark spot as the display.

Figure 19C:
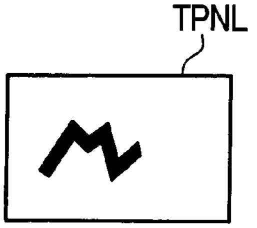
Figure 19D:
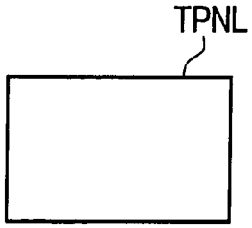

Then, this display is erased in response to an instruction from a manipulator. That is, the locus drawn by a pen or the like can be used for some purpose; and, when the locus becomes no longer necessary, the erasing signal is applied in response to an instruction from the user, as shown in FIG. 19C, and the display of the locus is released, as shown in FIG. 19D.

Figure 20:
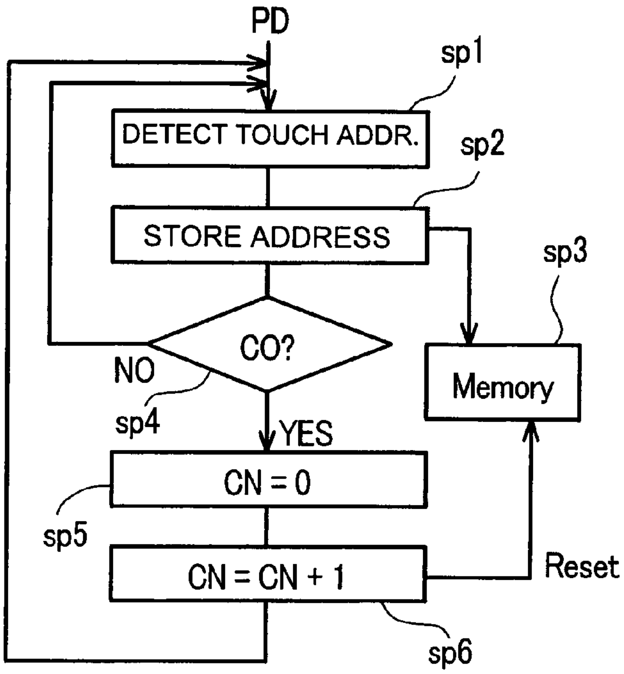
FIG. 20 is a flow chart showing one embodiment of the operation of the control circuit of the liquid crystal display device shown in FIG. 19.

FIG. 20 is a flow chart showing one embodiment of an operation performed by the control circuit TCON.

In the drawing, in step SP1, the touch address from the touch panel TPNL is detected. Then, the address data is stored in step SP2. Here, the address data is stored in a memory indicated by SP3. In this case, the locus drawn by a pen or the like appears on the display and the control circuit TCOM waits for an erasing request CO of the display.

When the control circuit TCON receives the erasing request CO in step SP4, the video signal data of a region corresponding to the stored address is replaced with the data for erasing in step SP5. Thereafter, the address data of the memory is reset in step SP6.

Here, in this case, the erasing signal may be produced only with respect to the vicinity of the touching region. Due to such a constitution, it is possible to constitute the liquid crystal display device without affecting images other than that of the touched portion.

Figure 21:
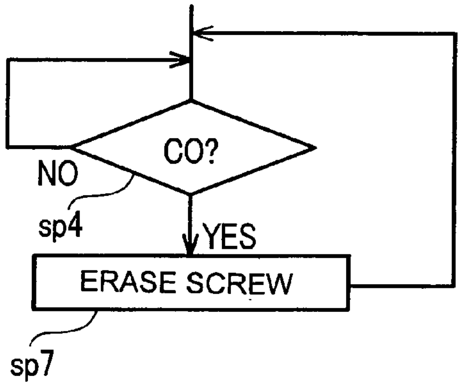
FIG. 21 is a flow chart showing another embodiment of the operation of the control circuit of the liquid crystal display device shown in FIG. 19.
Figures 22A, 22B, 22C:
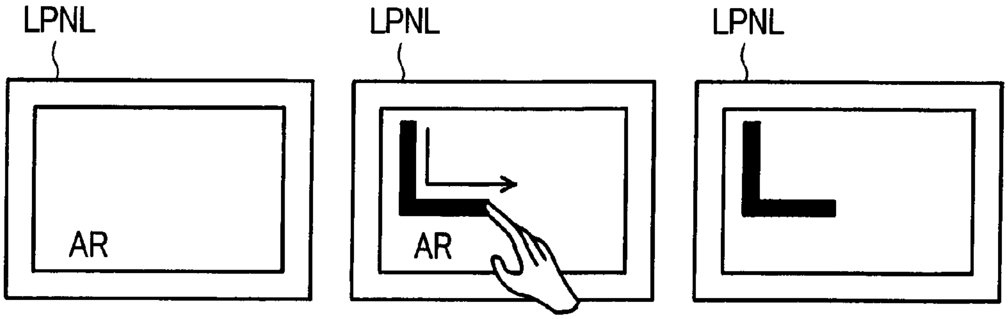
FIG. 22A to FIG. 22C are diagrams showing a drawback of a vertical orientation type liquid crystal display device.
Figure 23A:
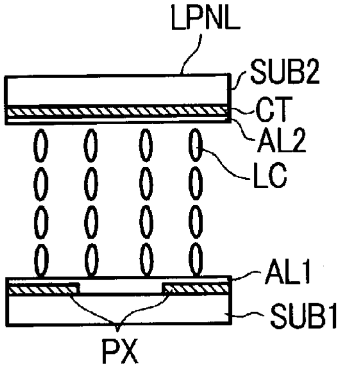
FIG. 23A to FIG. 23C are sectional diagrams showing one example of the behavior of liquid crystal molecules in a vertical orientation type liquid crystal display device.
Figure 23B:
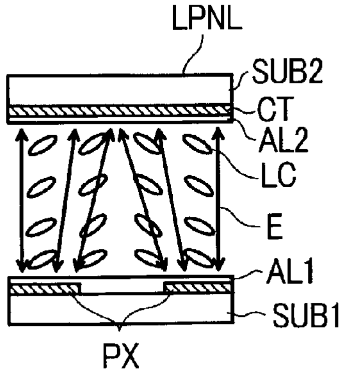
Figure 23C:
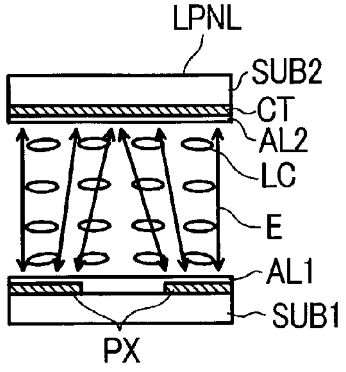
Figure 24A:
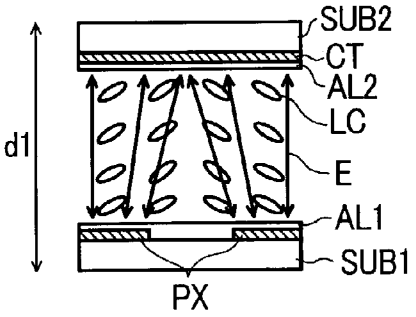
FIG. 24A to FIG. 24C are sectional diagrams showing a drawback of the vertical orientation type liquid crystal display device concerning the behavior of liquid crystal molecules.
Figure 24B:
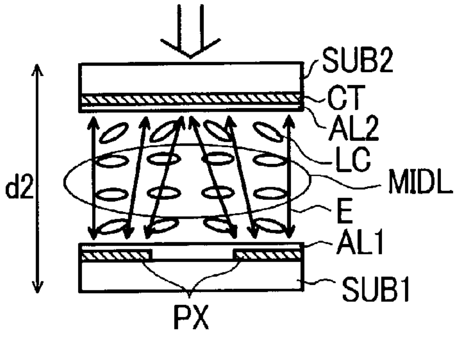
Figure 24C:
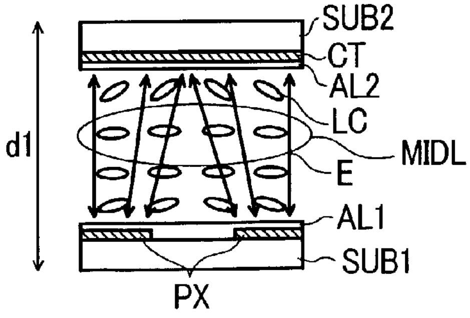
Figure 25A:
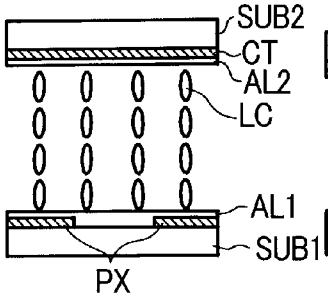
FIG. 25A to FIG. 25C are sectional diagrams showing the behavior of liquid crystal molecules in a vertical orientation type liquid crystal display device, in view of the relationship with a driving voltage (0% to 30%).
Figure 25B:
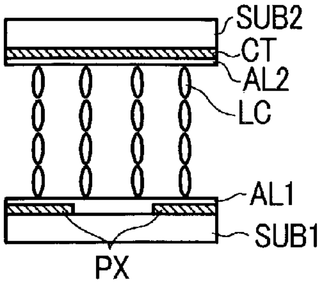
Figure 25C:
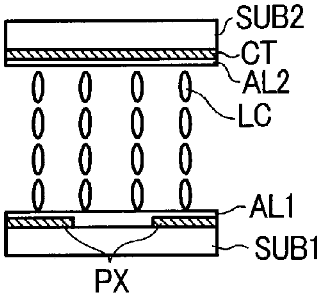
Figure 26A:
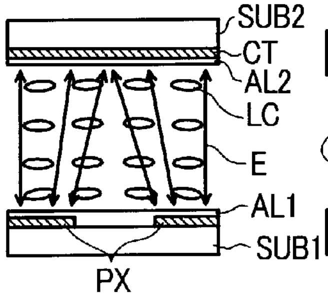
FIG. 26A to FIG. 26C are sectional diagrams showing the behavior of liquid crystal molecules in a vertical orientation type liquid crystal display device, in view of the relationship with a driving voltage (70% to 100%).
Figure 26B:
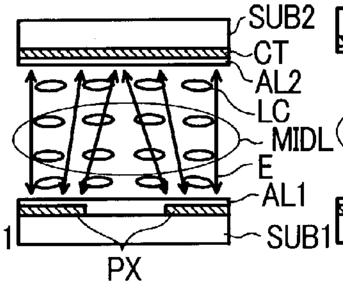
Figure 26C:
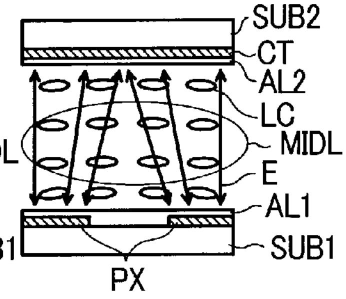
Figure 27A:
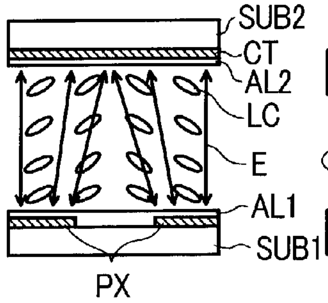
FIG. 27A to FIG. 27C are sectional diagrams showing the behavior of liquid crystal molecules in a vertical orientation type liquid crystal display device, in view of the relationship with a driving voltage (30% to 70%).
Figure 27B:
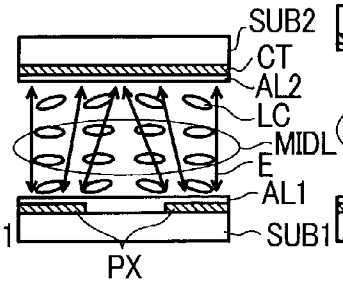
Figure 27C:
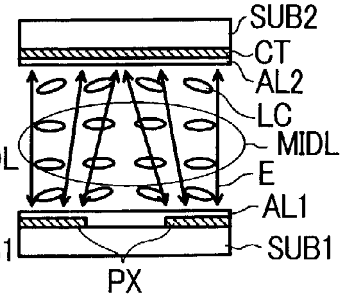

FIG. 21 is a flow chart showing one embodiment of an operation performed by the control circuit TCON and is shown by extracting a portion of FIG. 20.

As shown in the drawing, when the control circuit TCON receives the erasing request in step SP4, in step SP7, the whole screen is erased without performing the replacement of the video signal as shown in FIG. 12 or FIG. 14, for example. In this case, it is possible to obtain an advantageous effect that the memory is no longer necessary.

In this embodiment, the memory property, which has been considered to give ill effects to the display, is positively utilized in the display. In describing characters or images using the touch panel, when a trace which is formed by touching of the pen is observed, it is easier for the user to describe the character or the image so that the availability of the user is enhanced.

Accordingly, in this embodiment, erasing is performed in accordance with the instruction of the user such that an erasing signal is inputted upon receiving the instruction from the user.

Here, it is desirable to execute the erasing request using software. By setting some address as an address which issues a display signal, when a user merely touches the region, an erasing signal is issued and erasing of the memory image can be realized.

It is needless to say that to the above-mentioned liquid crystal display device having the touch panel TPNL, techniques which are described in respective embodiments of the liquid crystal display device having no touch panel TPNL are applicable.

As can be clearly understood from the foregoing explanation, according to the liquid crystal display device of the present invention, the above-mentioned dark spot can be obviated. Further, it is possible to effectively utilize the above-mentioned dark spot.

What is claimed is:

1. A liquid crystal display device comprising:

a first substrate and a second substrate which are arranged to face each other in an opposed manner by way of liquid crystal; and first electrodes which are formed in a pixel region of a liquid-crystal-side surface of the first substrate and second electrodes which are formed in a pixel region of a liquid-crystal-side surface of the second substrate, wherein liquid crystal molecules are arranged in the substantially vertical direction with respect to the substrates in a state that an electric field is not generated between the first electrodes and the second electrodes, and a predetermined voltage which is equal to or less than 20% of a maximum voltage applied between the first electrodes and the second electrodes is applied between at least one of the first electrodes and at least one of the second electrodes at a rate of not more than 5 times per 1 second.

2. A liquid crystal display device according to claim 1, wherein in a whole or a portion of a liquid crystal display part which is formed of a mass of pixel regions, the predetermined voltage is intermittently applied.

3. A liquid crystal display device comprising:

a first substrate and a second substrate which are arranged to face each other in an opposed manner by way of liquid crystal; and first electrodes which are formed in a pixel region of a liquid-crystal-side surface of the first substrate and second electrodes which are formed in a pixel region of a liquid-crystal-side surface of the second substrate, wherein liquid crystal molecules are arranged in the substantially vertical direction with respect to the substrates in a state that an electric field is not generated between the first electrodes and the second electrodes, and a predetermined voltage which is equal to or less than 20% of a maximum voltage applied between the first electrodes and the second electrodes in the pixel regions constituting at least a portion of a mass of the pixel regions is applied between at least one of the first electrodes and the second electrodes at a rate of one or more times per 1 minute and not more than 5 times per 1 second.

4. A liquid crystal display device comprising:

a first substrate and a second substrate which are arranged to face each other in an opposed manner by way of liquid crystal; and first electrodes which are formed in a pixel region of a liquid-crystal-side surface of the first substrate and second electrodes which are formed in a pixel region of a liquid-crystal-side surface of the second substrate, wherein liquid crystal molecules are arranged in the substantially vertical direction with respect to the substrates in a state that an electric field is not generated between the first electrodes and the second electrodes, and a predetermined voltage which is equal to or less than 20% of a maximum voltage applied between the first electrodes and the second electrodes in the pixel regions constituting at least a portion of a mass of the pixel regions is applied between at least one of the first electrodes and at least one of the second electrodes at a rate of one or more times per 5 seconds and not more than 5 times per 1 second.

5. A liquid crystal display device according to claim 1, wherein the pixels are arranged in a matrix array, the respective pixels are driven such that driving is sequentially extended from a group of pixels arranged in parallel in one line to another group of pixels which is arranged in parallel to the group of pixels in the direction which crosses the direction of one line, and applying of voltage being equal to or less than 20% of the maximum voltage applied between the first electrode and the second electrode is sequentially performed per one or a plurality of lines.

6. A liquid crystal display device according to claim 1, wherein a touch panel is provided at an observation side.

7. A liquid crystal display device according to claim 1, wherein the predetermined voltage which is equal to or less than 20% of the maximum voltage with respect to the voltage applied between the first electrodes and the second electrodes is a minimum voltage.

8. A liquid crystal display device according to claim 1, wherein the liquid crystal display device adopts a normally black mode in which a black display is performed when the electric field is not generated between the first electrodes and the second electrodes.

9. A liquid crystal display device according to claim 1, wherein the liquid crystal display device adopts a normally white mode in which a white display is performed when the electric field is not generated between the first electrodes and the second electrodes.

10. A liquid crystal display device according to claim 3, wherein the liquid crystal display device adopts a normally black mode in which a black display is performed when the electric field is not generated between the first electrodes and the second electrodes.

11. A liquid crystal display device according to claim 3 wherein the liquid crystal display device adopts a normally white mode in which a white display is performed when the electric field is not generated between the first electrodes and the second electrodes.

12. A liquid crystal display device according to claim 1, wherein the liquid crystal display device adopts a normally white mode in which a white display is performed when the electric field is not generated between the first electrodes and the second electrodes, and the predetermined voltage which is equal to or less than 20% of the maximum voltage with respect to the voltage applied between the first electrodes and the second electrodes of pixels is constituted of a black gray scale signal.

13. A liquid crystal display device according to claim 1, wherein the liquid crystal display device adopts a normally black mode in which a black display is performed when the electric field is not generated between the first electrodes and the second electrodes, and the predetermined voltage which is equal to or less than 20% of the maximum voltage with respect to the voltage applied between the first electrodes and the second electrodes of pixels is constituted of a white gray scale signal.

14. A liquid crystal display device according to claim 6 wherein the liquid crystal display device adopts a normally black mode in which a black display is performed when the electric field is not generated between the first electrodes and the second electrodes, and the predetermined voltage which is equal to or less than 20% of the maximum voltage with respect to the voltage applied between the first electrodes and the second electrodes of pixels is constituted of a black gray scale signal.

15. A liquid crystal display device according to claim 6 wherein the liquid crystal display device adopts a normally white mode in which a white display is performed when the electric field is not generated between the first pixel and the second electrodes, and the predetermined voltage which is equal to or less than 20% of the maximum voltage with respect to the voltage applied between the first electrodes and the second electrodes is constituted of a white gray scale signal.

16. A liquid crystal display device according to claim 1, wherein the predetermined voltage is applied at the rate between the at least one of the first electrodes and the at least one of the second electrodes so as to substantially obviate occurrence of a dash spot phenomenon of the liquid crystal display device.

* * * * *